United States Patent [19]
Sabacky et al.

[11] Patent Number: 5,348,723
[45] Date of Patent: * Sep. 20, 1994

[54] SYNTHESIS OF SEMICONDUCTOR GRADE TUNGSTEN HEXAFLUORIDE

[75] Inventors: Bruce J. Sabacky, Westminster; Robert E. Doane, Idaho Springs, both of Colo.

[73] Assignee: Bandgap Technology Corporation, Broomfield, Colo.

[*] Notice: The portion of the term of this patent subsequent to Jan. 20, 2009 has been disclaimed.

[21] Appl. No.: 476,232

[22] Filed: Feb. 7, 1990

[51] Int. Cl.$^5$ .................... C01G 41/04; C01G 41/02
[52] U.S. Cl. ........................... 423/489; 423/606
[58] Field of Search .................. 423/489, 492, 606

[56] References Cited

U.S. PATENT DOCUMENTS

| | | |
|---|---|---|
| 3,995,011 | 11/1976 | Jache et al. .................. 423/489 |
| 4,080,420 | 3/1978 | Kasserra et al. ............. 423/606 |
| 4,803,062 | 2/1989 | Munn et al. .................. 423/492 |

FOREIGN PATENT DOCUMENTS

| | | |
|---|---|---|
| 333084 | 9/1989 | European Pat. Off. . |
| 2759117 | 7/1979 | Fed. Rep. of Germany ...... 423/606 |
| 5003995 | 2/1969 | Japan ............................. 423/606 |
| 29462 | 7/1973 | Japan ............................. 423/606 |

Primary Examiner—John Niebling
Assistant Examiner—Brian M. Bolam
Attorney, Agent, or Firm—Michael A. Ciomek; Eugene J. Kalil

[57] ABSTRACT

Semiconductor grade tungsten hexafluoride ($WF_6$) is produced by reacting tungsten metal with a recirculating flow of gaseous $WF_6$ containing a small concentration of fluorine in a heated reactor. The high purity $WF_6$ produced is useful for deposition of tungsten metallization in fabricating VLSI integrated circuitry.

8 Claims, 1 Drawing Sheet

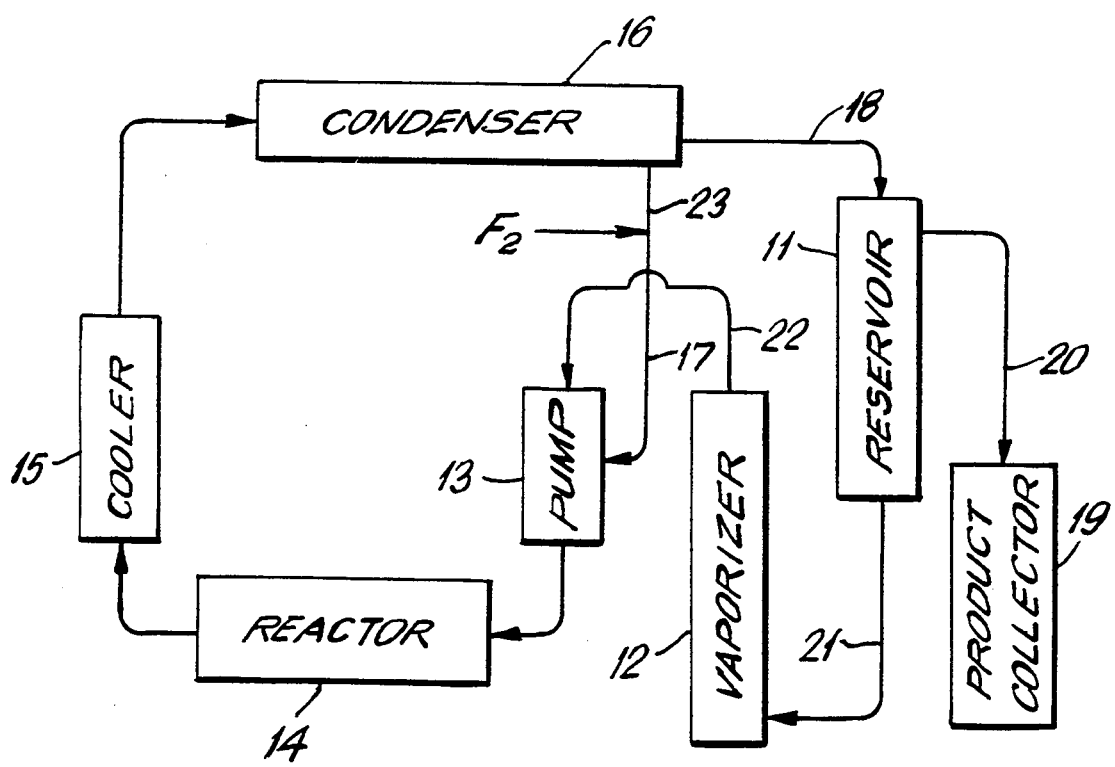

SYNTHESIS OF SEMICONDUCTOR GRADE TUNGSTEN HEXAFLUORIDE

BACKGROUND OF THE INVENTION

It is known that deposition of metallic tungsten on semiconductor materials in the fabrication of VLSI integrated circuitry is useful. For this application, the tungsten metal deposited should be, to the highest degree possible, devoid of alpha-particle emitting impurities such uranium and thorium which can cause soft error generation in memory circuits. Impurities such as sodium also must be eliminated from the tungsten used for this purpose to avoid diffusion thereof from the tungsten metal layer into active regions of the circuit, an event which could destroy or degrade circuit performance.

Industrial production of high purity tungsten traces back to the development of tungsten wire for use in incandescent lamp filaments since it was found that certain impurities, such as iron, rendered tungsten billets brittle and unworkable. The development of the technology is recounted in Smithells book *Tungsten, A. Treatise On Its Metallurgy, Properties And Applications* published by Chapman & Hall Ltd., London, 1952.

In providing a tungsten product for use in semiconductors it is found that impurity levels in the tungsten must be far lower, i.e., orders of magnitude lower, than that required merely to make tungsten ductile. The present invention is directed to means and methods of providing a tungsten product which may be employed in treating semiconductor materials without producing adverse or destructive effects in circuits produced using such a tungsten product.

The invention is particularly directed toward the production of tungsten hexafluoride of ultra-high purity which may be employed to deposit metallic tungsten on semiconductor materials without producing the aforementioned deleterious effects on the resulting circuits.

Deposition of tungsten from tungsten hexafluoride offers practical advantages as compared to deposition of tungsten by the sputtering method as has been practiced in the semiconductor industry.

SUMMARY OF THE INVENTION

The invention is directed to the production of tungsten hexafluoride ($WF_6$), a compound having a boiling point of about 17.5° C. by reacting tungsten metal, usually as powder, with a gas stream containing major amounts of tungsten hexafluoride and minor amounts of fluorine at a temperature exceeding the boiling point of tungsten hexafluoride. Advantageously, the process is carried out continuously by recirculating the gas stream past the reactant tungsten metal in a closed system with removal of product tungsten hexafluoride and addition of reactant fluorine to the reactant gas mixture as required.

DESCRIPTION OF THE DRAWING

The drawing is a flow sheet describing the process of the invention schematically.

DETAILED DESCRIPTION OF THE INVENTION

In carrying out the invention it is preferred to employ a reactor, which is preferably made of nickel, provided with means for circulating gas to and through the reactor and recirculating the product gas in a closed system. Means for removing product tungsten hexafluoride, preferably as a liquid, and means for introducing makeup fluorine are provided.

It is essential, in accordance with concepts of the invention, that the circulating gas stream contain as its principal ingredient a major proportion of gaseous tungsten hexafluoride and a minor proportion of fluorine. Preferably, the fluorine content of the gaseous mixture is about 5% to about 40%, by volume. More preferably, the fluorine content is about 10% to about 30%, by volume, e.g., about 20%, by volume. No other ingredients are needed in the circulating gas stream, although, if desired up to about 10%, by volume of helium or argon may be present. In practice, the fluorine content of the gaseous mixture is controlled to adjust the kinetics of the reaction to provide acceptable rates of production, to control the evolution of heat by the exothermic reaction of fluorine with tungsten and to insure the overall reaction is sufficiently slow to allow the metallic tungsten to be fluorinated preferentially to other impurities that may be present in the metallic tungsten.

The tungsten reactant is preferably particulate form, ranging in size from pellets, prills and granules to a powder initially having a particle size of about 5 to 20 microns diameter. For best results, the initial powder should be of high purity, e.g., should contain no more than 5 ppm total impurities excluding oxygen. Oxygen content is preferably less than 500 ppm. In particular, it is preferred that uranium, thorium, iron, chromium, sodium, copper, molybdenum and potassium should not exceed about 1, 1, 300, 100, 200, 800, 200 and 150 ppb each, respectively.

The reaction is carried out at a temperature exceeding the boiling temperature of tungsten hexafluoride, e.g., within the temperature range of about 300° to about 600° C., preferably about 350° to about 450° C., e.g., about 400° C. The pressure of reaction may be atmospheric to slightly elevated, e.g., about 1.1 to about 2.0 atmosphere.

The reaction is carried out in a closed system comprising a reactor chamber and gas circulating means, with provisions for removing product tungsten hexafluoride, preferably as a liquid, and means for introducing fresh reactant fluorine as required. Means for flushing the system attendant upon the introduction of fresh reactant tungsten may also be provided. Gases such as helium, argon or nitrogen may be used for this purpose. Helium and argon are advantageously used. In order to minimize product contamination, the reactor chamber, and preferably the remaining apparatus as well, are made of nickel. Nickel reacts only slowly with fluorine and forms a protective film when exposed to a fluorine-containing atmosphere. This action aids prevention of product contamination by the apparatus. It is to be appreciated in this connection that fluorine is an extremely aggressive element. A preferred apparatus for conducting the process is a horizontal tube reactor since such apparatus permits convenient batch introduction of reactant tungsten without rotating seals or other moving parts and minimizes recirculation of particulate tungsten in the system.

The process will now be described in conjunction with the flow sheet shown in the drawing; in which reservoir 11 is adapted to contain liquid $WF_6$ which flows from reservoir 11 to heated vaporizer 12 through pipe 21, producing a stream of $WF_6$ gas which then flows to the nozzle of a venturi pump 13 via pipe 22.

The height of the liquid column of $WF_6$ in reservoir 11, the temperature of vaporizer 12, and the configuration of the venturi nozzle of pump 13 primarily determine the pressure and flowrate of $WF_6$ through the pump and into the reactor 14 thence to cooler 15 and condenser 16. Pump 13 serves to circulate any non-condensable gases, including unreacted $F_2$, from the vapor space of condenser 16 back through the reactor via by-pass 23. The pressurized stream of $WF_6$ generated by the reservoir 11 and vaporizer 12 and entering the pump nozzle 10 serves as the motive fluid for the pump. The combined streams of non-condensable gases and $WF_6$ then exit the pump 13 and enter the reactor 14 containing tungsten powder or granules. Fluorine injected into the suction port 17 of the pump then reacts with tungsten metal in reactor 14 yielding additional $WF_6$. The reactor temperature is controlled carefully through use of external heaters, through control of the quantity of $F_2$ injected into stream 17, and through vaporizer temperature and reservoir inventory which, in turn, control the flowrate of $WF_6$ into the reactor. Gases exiting the reactor pass through a cooler 15 and then enter condenser 16 where $WF_6$ vapor is condensed to liquid $WF_6$. Liquid $WF_6$ then flows via stream 18 to reservoir 11, thereby completing the circuit. When sufficient $WF_6$ has been generated in the system through addition of $F_2$ and reaction with W, the level of liquid $WF_6$ in reservoir 11 reaches an overflow level and exits the system into product collector 19 via connector pipe 20.

In summary then, fluorine gas injected into the system at the suction port of recirculating pump 13 reacts with tungsten metal contained in reactor 14 to produce $WF_6$ that collects as a liquid product in collection vessel 19. The recirculation of $WF_6$ occurs continuously, with or without $F_1$ addition. As $F_2$ is added, additional $WF_6$ is generated as long as tungsten metal is available in reactor 14.

Control of the system is achieved through adjustment of the condenser and vaporizer temperatures as well as the inventory level of $WF_6$ liquid in reservoir 11. $F_2$ is injected into the system based on a continuously monitored system pressure. When the system pressure is at or below a determined set point, $F_2$ is injected until the system pressure reaches a second control point, at which time the $F_2$ flow is stopped. As the $F_2$ in the system is consumed and liquid $WF_6$ is produced, the system pressure falls, reaching the first control point. This $F_2$ addition cycle then begins again.

An example will now be given:

440 kilograms of commercial ammonium paratungstate (APT) containing no more than about 500 ppm of impurities with the principal impurities being Si, Fe, Mo, and Na with no single impurity exceeding 300 ppm, were decomposed by heating at about 650° C., dissolved in cold concentrated ammonia solution and partially crystallized by boil off of water and ammonia to yield 300 kilograms of high purity APT. The resulting APT was hydrogen reduced to metallic tungsten powder which upon analysis was found to contain no more than 5 ppm total impurities with no impurity from the group consisting of U, Th, Fe, Na and K exceeding 0.5, 0.5, 330, 200 and 130 ppb, respectively. The process of calcination, dissolution, and partial crystallization can be repeated if desired to provide tungsten metal of even higher purity.

The resulting tungsten powder was fed to a horizontal tube reactor where it was converted to tungsten hexafluoride by reaction with a gas stream consisting of tungsten hexafluoride containing 20%, by volume, of fluorine. Temperature in the reactor was maintained between 395° C. and 405° C. during the run and the recirculation rate was 20,000 standard liters of gas per kilogram of tungsten per hour. Tungsten hexafluoride of high purity was condensed from the gas stream and withdrawn as product at the rate of 0.2 kilograms per hour of operation. Tungsten hexafluoride obtained by this process contained no more than 1000 ppb total impurities with typical concentrations of specific impurities at the following levels:

|    | ppbw |
|----|------|
| Cr | 10   |
| Fe | 10   |
| K  | 10   |
| Na | 10   |
| Th | .1   |
| U  | .1   |

In summary, the invention embodies several unique features as follows:

1. The system is completely closed and contains no major components other than the two reactants, $F_2$ and W, the product, $WF_6$, and the preferred material of construction, nickel. Introduction of impurities such as oxygen and water vapor are therefore minimized since no diluent gases are used for temperature control in the reactor.

2. The system contains no moving parts, eliminating contamination from leaking seals on rotating shafts, etc. and contamination from erosion of the interior surfaces of the containment vessels.

3. The reaction of $F_2$ with W is forced to proceed at low controlled temperatures, thereby minimizing contamination from hot reactor walls, etc.

4. The low reaction temperatures eliminate the introduction of significant quantities of many impurities contained in the tungsten metal feedstock by preventing their volatilization and subsequent introduction into the liquid $WF_6$ product stream. This is the case, for instance, for fluorides of alkali and alkaline earth metals, many transition metals, and thorium.

5. Because of the continuous recirculation of $WF_6$ over tungsten metal in the reactor, impurity species that can be reduced by tungsten metal to species of lower relative volatility can be effectively removed from or prevented from entering the product stream. The impurities remain with the tungsten metal in the reactor. This is the case, for instance, for uranium.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The process for producing tungsten hexafluoride having a purity sufficient for use in semiconductor application which comprises placing tungsten metal in a closed reactor and reacting said tungsten metal with a gas stream consisting essentially of a major proportion of gaseous tungsten hexafluoride and a minor proportion of fluorine.

2. The process in accordance with claim 1 wherein said tungsten is in particulate form.

3. The process in accordance with claim 1, wherein the reaction is conducted at a pressure of about 1.1 to about 2.0 atmospheres.

4. The process in accordance with claim 1, wherein said gas stream is recirculated past said tungsten metal and product tungsten hexafluoride is recovered from said gas stream.

5. The process in accordance with claim 6, wherein said reactor is made of nickel.

6. The process in accordance with claim 1, wherein the rate of reaction between said tungsten metal and said fluorine gas is controlled by controlling the fluorine concentration in said gas stream, the recirculation rate of said gas stream and the reaction temperature so that metallic tungsten is fluorinated preferentially to other impurities which are present in the metallic tungsten.

7. The process in accordance with claim 1, wherein said tungsten metal is produced by decomposing ammonium paratungstate to tungstic oxide, dissolving the tungsten oxide in ammonia to produce an ammonium tungstate solution, crystallizing a portion only of said solution to ammonium paratungstate, said crystals being of improved purity compared to the starting material, and reducing said crystals to metal with hydrogen.

8. The process in accordance with claim 1, wherein said gas stream contains about 5% to about 40%, by volume of fluorine.

* * * * *